United States Patent [19]

Sherrard

[11] Patent Number: 4,726,670

[45] Date of Patent: Feb. 23, 1988

[54] SECURITY VIEWER

[76] Inventor: William D. Sherrard, 38 Crouch Hall Road, London N8, England

[21] Appl. No.: 862,104

[22] PCT Filed: Sep. 12, 1985

[86] PCT No.: PCT/GB85/00417

§ 371 Date: May 12, 1986

§ 102(e) Date: May 12, 1986

[87] PCT Pub. No.: WO86/01908

PCT Pub. Date: Mar. 27, 1986

[30] Foreign Application Priority Data

Sep. 12, 1984 [GB] United Kingdom ............... 8423090

[51] Int. Cl.⁴ .................. G02B 7/02; G02B 23/16; G02B 25/04
[52] U.S. Cl. ................................. 350/538; 350/576; 350/573
[58] Field of Search ............... 350/538, 576, 561, 573, 350/453, 319

[56] References Cited

U.S. PATENT DOCUMENTS 1,682,139  8/1928  Mitchell .................. 350/538
2,262,203 11/1941  Redstone et al. ........ 350/319
2,638,810  5/1953  Berleme ................... 350/319
3,434,773  3/1969  Pitchford ................. 350/538
3,973,835  8/1976  Miyakawa et al. ....... 350/319
4,257,670  3/1981  Legrand .................. 350/561

FOREIGN PATENT DOCUMENTS 2254954  3/1974  Fed. Rep. of Germany ...... 350/252
1409084  9/1964  France ............................ 350/252

Primary Examiner—Jon W. Henry
Attorney, Agent, or Firm—Wolf, Greenfield & Sacks

[57] ABSTRACT

A security viewer to be mounted through a non-transparent partition, e.g. a door (7), comprises a housing (1) which extends through the door. The housing includes an inlet aperture (8), a screen (13) and a lens system (9, 10, 11, 12). The lens system forms a real image on the screen (13) of a field of view outside the door. Thus, an observer on the inside of the door can observe the real image without the need to place his eye against the viewer. The viewer is held in place by bezels (18, 19) which are glued in place on opposite sides of the door. The bezel (18) is slidable along the housing (1) to accommodate different door thicknesses.

11 Claims, 2 Drawing Figures

U.S. Patent
Feb. 23, 1988
4,726,670
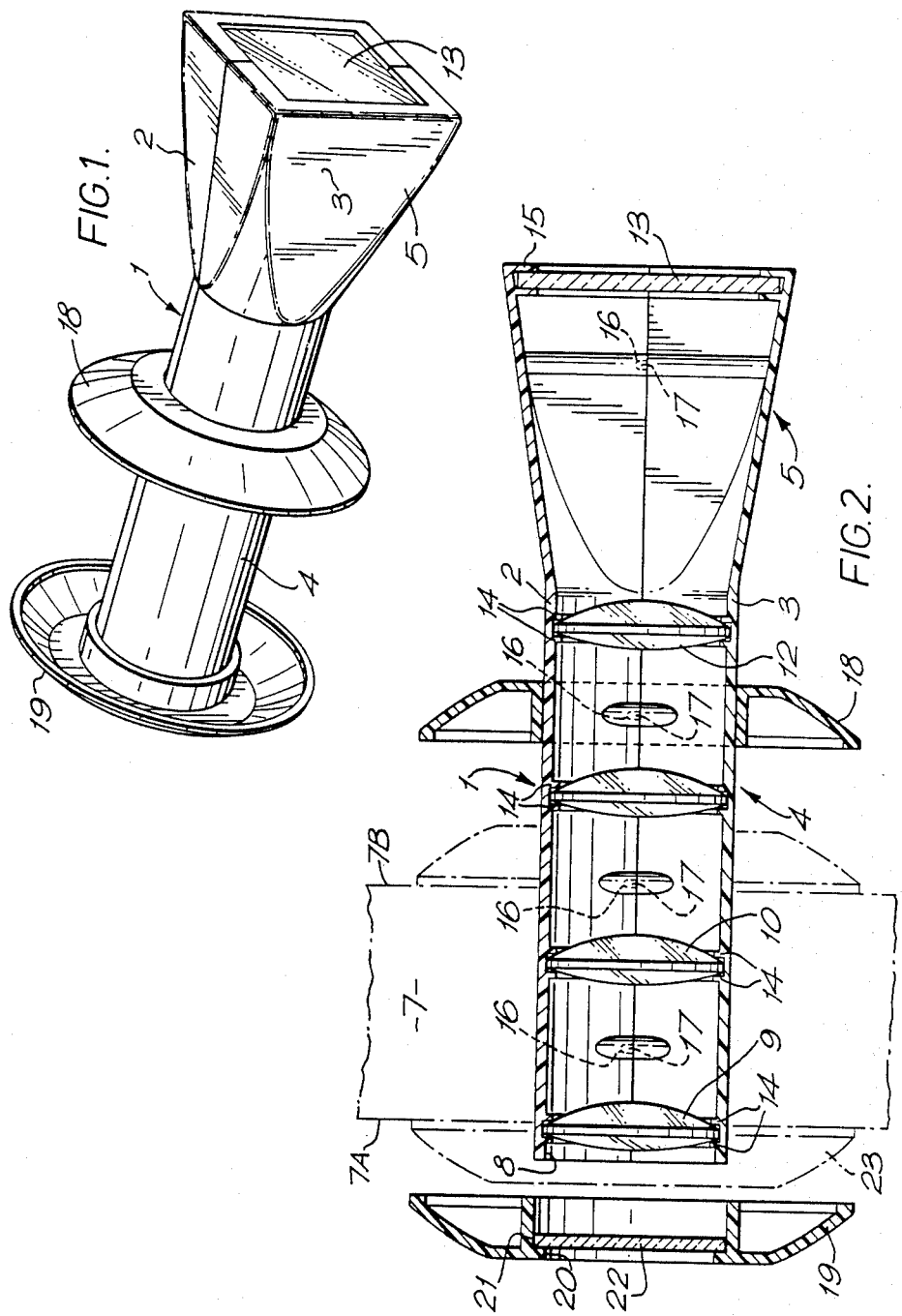

SECURITY VIEWER

DESCRIPTION

This invention relates to a security viewer to be mounted through a non-transparent partition, for example a door.

Security viewers for doors are well known and one example is described in GB Patent Specification No. 1 129 121. This known viewer consists of a spy glass which is mounted in a hole drilled through the door and acts in the manner of a spy glass to permit a person on the inside of the door to observe callers at the door. A disadvantage of the known spy glass type of security viewer is that its optical system needs to provide a wide field of view and consequently the image produced is somewhat distorted so that an observer of the inside of the door may have difficulty in identifying and recognising a caller. Also, with the known viewer, the observer needs to place his or her eye against the door in order to observe the image formed by the spy glass. Usually, the spy glass is mounted approximately 2 meters from the base of the door and consequently cannot be readily used by the elderly and the infirm.

In accordance with the invention there is provided a security viewer which provides an image of reduced distortion and which can be observed without the need for the observer to place his or her eye against the door.

In accordance with the invention, the security viewer comprises a housing for extending through a partition such as a door, the housing including an inlet aperture for collecting light from a first side of the partition, a screen for being observed from a second oppossite side of the partition, and lens means for forming from the collected light a real image on the screen of the field of view on the first side of the partition.

The formation of the real image on the screen has the advantage that the image of the field is observable from positions spaced from the partition so that the observer does not need to place his or her eye against the partition as in the prior art.

In a preferred from of the invention, the housing of the security viewer includes a tubular portion to be fitted through the hole in the partition, the tubular portion having the inlet aperture at one end thereof. An outer bezel is arranged to be fitted on to the end of the tubular housing portion so as to abut the partition. Also, an inner bezel is slidably mounted on the tubular housing portion and in use is glued in an appropriate position depending on the thickness of the door.

Preferably the lens means comprises an even number of biconvex lenses e.g. four arranged coaxially within the tubular portion of the housing. The four lenses are conveniently identical and have different radii of curvature on their opposite faces. In one embodiment, the face of each lens with the greatest curvature radius is arranged facing the screen but I have also found that by turning round one of the lenses, an improved image sharpness is produced. Preferably, a protective transparent member is arranged spanning the inlet aperture. Conveniently, the protective transparent member may be held in place by means of the outer bezel.

The screen is conveniently made of ground glass. In one embodiment, the screen is 35 mm square and thus provides an image which is observable from up to 3 or 4 meters from the partition.

In order that the invention may be more fully understood and embodiment thereof will now be described by way of illustrative example with reference to the accompanying drawings in which:

FIG. 1 is a schematic perspective view of a security viewer according to the invention; and FIG. 2 shows the viewer of FIG. 1 in transverse section mounted in a door, the door being shown in hatched outline.

The security viewer consists of an elongate housing 1 formed of cooperating moulded plastics parts 2, 3 typically made of ABS material. The housing parts 2, 3 define a tubular portion 4 and an outwardly tapered portion 5. The tubular portion 4 in use is inserted through a hole 6 in a partition 7, typically a door of the building. The tubular portion 4 contains at one end thereof an inlet aperture 8 which collects light from one side of the partition. Lenses 9 to 12 cast on a ground glass screen 13 a real image of a field view determined by the light entering the inlet aperture 8.

The housing parts 2, 3 are formed with integral annular stops 14 to receive the lenses 9 to 12, and a peripheral recess 15 to receive the ground glass screen 13. The two housing parts 2, 3 are typically glued together and are formed with integral cooperating lugs and sockets 16, 17 to achieve alignment of the housing parts.

The tubular housing portion 4 is cylindrical and has slidably mounted thereon an inner plastics bezel 18 which defines a circular flange bounding the periphery of the housing. A similar outer plastics bezel 19 is adapted to be push fitted on to the end of the cylindrical housing portion 4. The outer bezel 19 includes an opening 20 which is aligned with the inlet aperture 8. The opening 20 is formed with a flanged periphery 21 to receive a transparent toughened glass protective member 22. The member 22 covers the lens 9 to prevent it from being scratched.

To install the viewer, a hole is drilled through the door, typically 2 meters above the floor. The cylindrical housing part 4 is pushed into the hole with the inner bezel 18 already slidably fitted. The housing portion 4 is adjusted to the position shown in FIG. 2 such that the inlet aperture 8 protrudes sufficiently to receive the outer bezel 19, with the bezel 19 abutting outer surface 7a of the door (in the position shown in hatched outline 23).

The inner bezel 18 is then slid along the cylindrical housing part 4 until it abuts inner surface 7b of the door (i.e. in the position shown by hatched outline 23). The housing 1 is then removed from the door and the inner bezel 18 is glued to the cylindrical housing portion 4 using an appropriate quick drying glue for example a cynoacrylate ester adhesive. The housing portion together with the glued inner bezel 18 is returned to the door and inserted into the hole 6. The outer bezel 19 is then glued in place using a similar glue, with the transparent member 22 being held in position by the bezel 19.

The slidable arrangement of the inner bezel 18 has the advantage that the security viewer can be fitted to doors of different thicknesses. Moreover, the bezels 18, 19 cover any burrs and the like which may be formed when the hole 6 is drilled in the door. Also, it will be appreciated that the fixing arrangement for the viewer has the advantage that no additional screws or like intrusive fixings need to be used to locate the viewer.

Referring now in more detail to the lens system, an even number of lenses is provided to produce an erect image on the screen 13. The four lenses 9 to 12 of the preferred embodiment are biconvex lenses with different radii of curvature on their opposite faces. The lenses are equally spaced part by a distance of 2.7 mm. The lenses have a diameter of 30 mm and radii of curvature R=30 mm, r=60 mm. As shown in FIG. 2, the faces with the least radii of curvature R all face towards the screen 13. However, I have found that by reversing the direction of the lens 10, i.e. to provide its face with curvature r facing towards the screen 13, an improved, less distorted and sharper image is produced on the screen 13.

The outside diameter of the cylindrical housing portion 14 is 36 mm and the overall length of the housing is 146 mm. The screen 13 is spaced 55 mm from the lens 12.

The screen 13 is 35 mm square and thus provides a relatively large image which can be seen from 3 to 4 meters from the door.

The viewer of the invention can be used with advantage in the entrance door of a domestic building and has the advantage that it is not necessary for an observer inside the door to place his or her eye against the viewer to observe a caller at the door. Instead, the real image formed on the screen 13 can be observed from some distance thus facilitating use of the viewer by the elderly and the infirm, for example.

It will be appreciated that the invention may be used in partitions other than doors. However, the invention has particular application to doors in aircraft, ships cabins, factories and offices. It can also be used in banks, photographic darkrooms and hospitals. The provision of the ground glass screen has the advantage that the viewer operates in one direction only, i.e. a caller at the door cannot use the viewer to observe the inside of the dwelling.

In a modified form of the invention, the housing includes a decorative metal sheath surrounding the housing parts 2, 3, so as to form a generally conical portion surrounding the tapered portion 5. In the modified arrangement, the bezel 18 may be made of spun metal rather than plastic.

I claim:

1. A security viewer to be mounted through a non-transparent partition, comprising a housing for extending through the partition, the housing including a cylindrical portion, an inlet aperture at one end of the cylindrical portion for collecting light from a first side of the partition, and a tapered portion at the other end of the cylindrical portion, a screen in the tapered portion for being observed from a second opposite side of the partition, lens means in the housing for forming from the collected light a real image on said screen of a field of view on the first side of the partition, whereby to render the field of view observable from the second side of the partition by observation of the screen, an outer bezel to be fitted onto said one end of the cylindrical housing portion to abut the partition on said first side thereof, the bezel forming an annular flange around the cylindrical housing portion, the outer bezel including an opening to be aligned with said inlet aperture, and a protective transparent member for spanning said opening, said screen having a symmetrical quadrilateral periphery with a diagonal dimension greater than the diameter of the cylindrical housing portion.

2. A security viewer according to claim 1 wherein said lens means comprises an even number of convex lenses arranged coaxially along the housing to produce an erect real image on the screen.

3. A security viewer according to claim 2 wherein said lens means comprises four identical biconvex lenses equally spaced apart.

4. A security viewer according to claim 3 wherein each said biconvex lens has different radii of curvature on opposite faces thereof, the face thereof with the smallest curvature radius facing the screen.

5. A security viewer according to claim 3 wherein each said biconvex lens has different radii of curvature on opposite sides thereof, the two lenses most adjacent the screen and the lens furthest from the screen having the faces thereof with the smallest radius of curvature facing the screen.

6. A security viewed according to claim 1 wherein the housing includes cooperating first and second moulded plastics parts each including integrally moulded stops to receive the lens means, and recess means mounting said screen in the housing.

7. A security viewer according to claim 1 wherein said screen is translucent, said lens means being arranged to form said image from one side of the screen such that the image is observable from the other side of the screen.

8. A security viewer according to claim 7 wherein said screen comprises a ground glass screen.

9. A security viewer to be mounted through a non-transparent partition, comprising a housing for extending through the partition, the housing including a cylindrical portion having at one end thereof an inlet aperture for collecting light from the first side of the partition, and at the other end thereof a tapered portion which houses a screen for being observed from a second opposite side of the partition, lens means in the housing for forming from the collected light a real image on the screen of the field of view on the first side of the partition, whereby to render said field of view observable from the second side of the partition by observation of the screen, an outer bezel to be fitted onto one end of said tubular housing portion to abut said partition on the first side thereof, and an inner bezel for being movably mounted on said tubular housing portion to abut the partition on the second side thereof, said screen having a symmetrical quadrilateral periphery with a diagonal dimension greater than the diameter of the tubular housing portion.

10. A security viewer according to claim 9 wherein the outer bezel includes an opening to be aligned with said inlet, and including a protective transparent member for spanning said opening.

11. A security viewer according to claim 9 wherein said tubular housing portion is cylindrical and said bezels provide annular flanges bounding the periphery of the cylindrical housing portion.

* * * * *